Jan. 6, 1970          F. W. KERFOOT, JR., ET AL          3,488,683
VARIABLE CONTOUR CAM
Filed Aug. 25, 1967
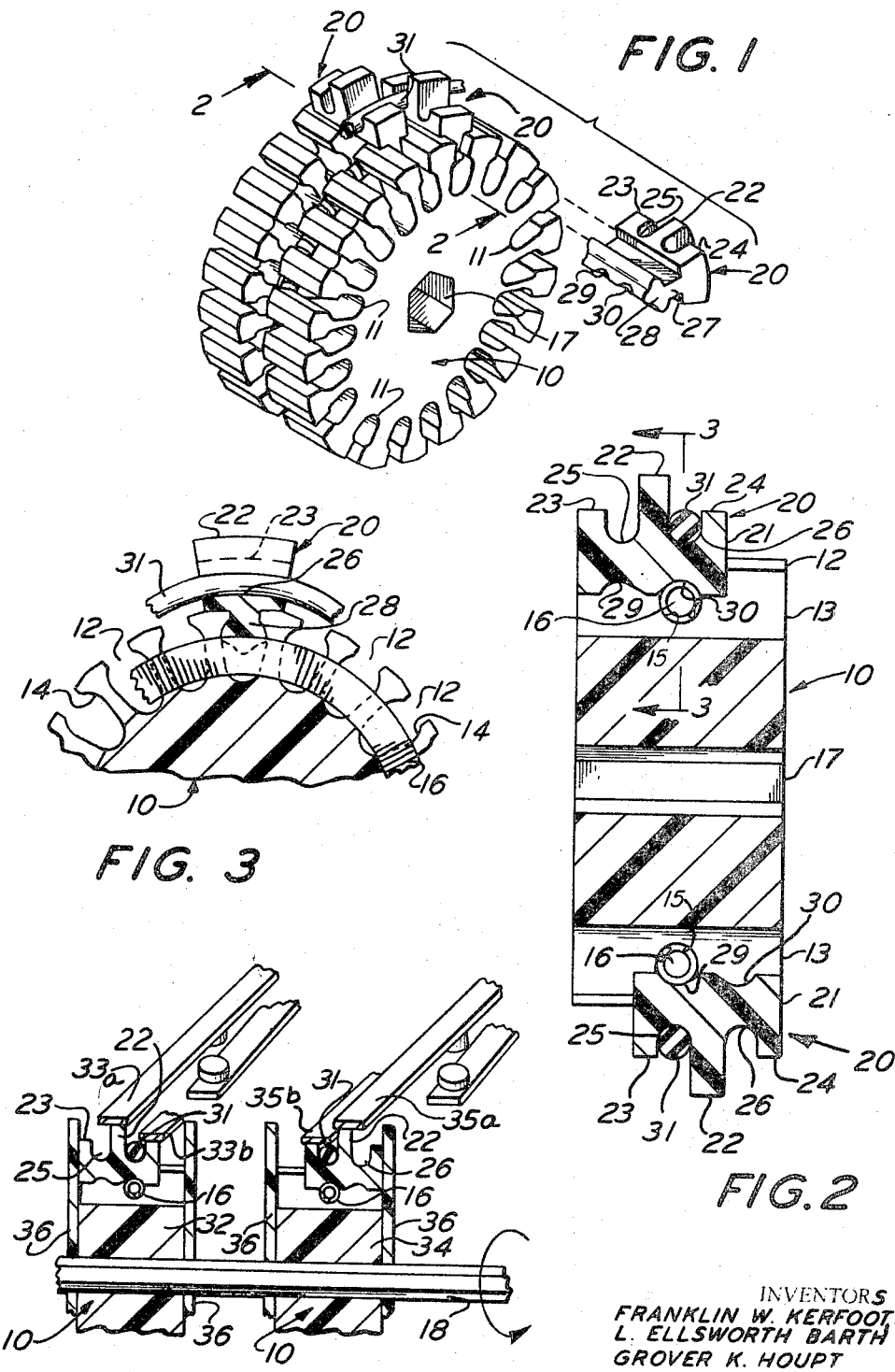
INVENTORS
FRANKLIN W. KERFOOT JR.
L. ELLSWORTH BARTH
GROVER K. HOUPT
BY
Nelson E. Kimmelman
ATTORNEY 3,488,683
VARIABLE CONTOUR CAM
Franklin W. Kerfoot, Jr., Newton Square, Lewis Ellsworth Barth, Langhorne, and Grover K. Houpt, Wayne, Pa., assignors to Automatic Timing & Controls, Inc., King of Prussia, Pa., a corporation of Pennsylvania
Filed Aug. 25, 1967, Ser. No. 663,259
Int. Cl. F16h 53/00
U.S. Cl. 74—568   7 Claims

ABSTRACT OF THE DISCLOSURE

A cam body is provided having one or more transverse channels spaced about its perimeter. Lobes, mounted in these transverse channels, can be positioned between a first transverse position and a second transverse position. An internal detent is also provided to keep each lobe in one of its predetermined positions. Optionally, a locking device can be utilized to fix the overall contour of the cam, as determined by the lobe placement, for a given application. Banks of such cams, on a common driven shaft, can be used to program a sequence timer having a plurality of associated followers.

BACKGROUND OF THE INVENTION

Field of the invention

This invention pertains to machine elements known as cams and more particularly to adjustable cams.

Description of the prior art

Many devices are known in which the peripheral contour of a cam is utilized as a mechanical input for a sensing system. A common example is the cooperative combination of a cam and a cam surface follower. Such mechanisms are the heart, for instance, of interval timers where the cam is rotated at constant speed about a fixed axis and where the follower traces the cam surface and is linked to open and close electrical contacts. The action pattern of the follower is determined by the contour of the cam and, for a given contour, is fixed.

The prior art has recognized the desirability of adjusting cams varying these relationships. In most instances, the adjustment of the cam has not involved a change of its contour but rather a change of its rotational registration with respect to the driven shaft on which it is mounted. Adjustable cams of this type are exemplified in U.S. Patents #3,080,770 and #3,270,582. The cams disclosed will only provide phase displacement of follower action and will not change the sequence.

Other approaches to the problem of varying the intervals on interval timers have been to provide a large driven drum or wheel on the surface of which a variable number of tabs can be mounted. When these tabs contact the arm of a switching element, closure is effected. Such a device is sold as a field adjustable programming switch, for example, under the trademark "Actan" by Sealectro Corp. of Mamaroneck, N.Y.

SUMMARY

Briefly summarized, the invention provides a variable contour cam for cooperation with one or more cam followers. The cam includes a body which has a predetermined number of transverse channels spaced around its perimeter. Lobes are provided which can be removably mounted in the channels and are reciprocal between a first predetermined transverse position, and at least a second predetermined position. Resilient detents are provided which keep a given lobe in either of the two predetermined transverse positions. After an appropriate number of lobes have been placed in appropriate positions, in accordance with a planned program, the lobes can be "locked up" with a locking device. The lobes and the channels are shouldered so as to prevent relative radial motion.

Thus, the invention achieves objects not possible in the prior art including the provision of a cam having a variable contour which is a function of the number and position of shiftable lobe elements mounted on the cam body.

The invention also achieves the object of providing an inexpensive, rugged variable contour cam which can be programmed in the field and which can be utilized as one module in a bank of co-axially mounted cams of the same type to produce complex sequence timing arrangements.

The invention and its objects will be better understood by a detailed reference to the drawings and the description of preferred embodiments of the invention which follows:

BRIEF DESCRIPTION OF THE DRAWING

In the drawing, wherein like reference numerals designate like parts:

FIGURE 1 represents a perspective view, partially exploded, of a variable contour cam embodying the invention.

FIGURE 2 represents a section taken on a plane indicated by line 2—2 of FIGURE 1.

FIGURE 3 represents a fragmentary section taken on line 3—3 of FIGURE 2.

FIGURE 4 represents a fragmentary section, taken along the diameter, of a cam-follower sequence timer embodying a plurality of cams of the invention.

DESCRIPTION OF THE PREFERRED EMBODIMENTS

Referring now to the drawings, it will be observed that the cam body, generally 10, includes a plurality of transverse channels 11 spaced about its perimeter. These channels, which extend through the cam body from face to face, include a narrow throat 12 and an enlarged internal cavity 13. Transition from throat 12 to cavity 13 may be achieved by a fillet or internal shoulder 14. Cam body 10 is also provided with a deep perimetrical groove 15 which intersects channels 11 at right angles and preferably bisects them. Mounted in groove 15 is a circular detent spring 16.

Body 10 is also provided with an axial core 17, preferably of polygon cross-section. Timers, in connection with which the cam of the invention is used, include a driven shaft 18 whose cross-section complements that of the core. Other equivalent methods of driving the cam may, of course, be utilized.

A plurality of lobes 20 are mounted in respective channels 11. The lobes may be considered as sectors of a circle having a diameter larger than the diameter of cam body 10. The lobes include an extending portion 21 which has a central rib 22, an outer rib 23 and an inner rib 24 (as shown in FIGURES 1 to 3 inclusive). In the particular embodiment shown, rib 22 projects radially farther than either rib 23 or 24 and constitutes the variable contour portion of the cam. Lobe portion 21 is provided with a perimetrical groove 25 between ribs 22 and 23 and with a second parallel perimetrical groove 26 between ribs 22 and 24.

Lobe 20 also includes an intermediate portion 27 and a larger dependent portion 28. Portion 27 fills throat 12 and portions 21 and 28 are so contoured that radial motion of lobe 20 with respect to cam body 10 is prevented as long as the lobe is in one of the channels 11. This may be done, for example, by contouring portion 28 to juxtapose fillet 14 and by shouldering portion 21 to juxtapose the perimeter of the cam body. The lobe, while free to slide in channel 11 cannot move radially.

Portion 28 is further provided with a plurality of arcuate notches 29 and 20 which cooperate with detent spring 16 to retain the lobe in one of its two predetermined transverse positions.

Once the lobes have been transversely positioned as desired they are retained in place by the resilient action of spring 16. This compressible spring is in simultaneous contact with cam body 10 and lobe 20, as may be best seen in FIGURE 2. Were it desired to shift the lobe 20 to the right (with reference to FIGURE 2) the application of force from the left would result in the compression of spring 16 and its disengagement from notch 30. When the lobe had been displaced so that notch 29 reached spring 16, the spring would expand and retain the lobe in its alternate position.

If there is a possibility of inadvertent displacement of the lobes in the channels a locking device such as a resilient O-ring 31 may be utilized. This ring fits into groove 25 or groove 26 of lobe 20 depending on which of the two transverse positions the lobe is to be locked. This resilient locking device encircles all of the lobes. When it is desired to reset the position of the lobes, spring 31 is first removed.

Operation of the cam of the invention may best be discussed in connection with FIGURE 4. What is shown there, in fragmentary form, is a sequence timer having a plurality of cams of the invention mounted on a driven shaft 18. Associated with cam 32 are five followers such as 33a and 33b arms. Similarly, the other cam 34 cooperates with switch arms 35a and 35b. The arms 33a and 35a are shown in their "break" position whereas arms 33b and 35b are shown in their lower or "make" positions. To change the sequencing of cam 32, it is only necessary to shift the lobe to the right so that follower arm 33a contacts rib 23 whereas arm 33b contacts rib 22. This can be done by removing O-ring 31 (if used) and then applying enough lateral force to depress spring 16 and shift the lobe to the right. Similarly, movement of the lobe of cam 34 to the left will enable arm 35a to ride atop rib 24 in the "make" position whereas arm 35b would ride on rib 22 in the "break" position. The O-ring if desired, would thereafter be reseated.

In FIGURE 4 a plurality of shrouds or end plates 36 are shown. These may be used to act as stops for the lobes and prevent their removal from channels 11. They also may include locking devices and thus fix the position of the cams on shaft 18. The shrouds may be integral with the cams or separate pieces.

The same principle of the internal detent may be used wherein it is desired to have more than two transverse lobe positions. For example, each cam could have lobe channels with four positions for associated follower arms, i.e., make, break, all inactive or all in the make position. Of course other combinations are likewise possible.

Having described the invention, what is claimed is:

1. A variable contour cam for cooperation with a follower:
a substantially solid cylindrical cam body having a predetermined number of transverse channels spaced about the perimeter thereof,
at least one lobe, mounted in one of said channels, said lobe being reciprocable between at least a first predetermined transverse position and a second predetermined transverse position,
internal detent means for maintaining said lobe in one of said transverse positions which comprises resilient means located between the innermost surface of said lobe and an outer surface of said cam body, said resilient means exerting a radially outward force against said innermost force, and
removable lobe locking means in contact with said lobe and radially spaced apart from the perimeter of said cam body by said lobe.

2. The cam of claim 1 which further includes removable tensioned locking means, generally following the contour of said cam body but radially spaced apart therefrom by each of said lobes.

3. The cam of claim 1 wherein said channel and the portion of said lobe which fits into said channel are shouldered to prevent radial motion of said lobe with respect to said channel.

4. The cam of claim 3 which further includes a perimetrical groove about said cam body; a compressible spring mounted in said groove in simultaneous contact with said body and said first lobe portion; movement of said lobe from either of its two transverse positions requiring exertion of a force great enough to compress said spring.

5. The cam of claim 1 wherein said innermost surface includes at least two laterally disposed grooves providing two detent positions of said lobe.

6. The cam according to claim 5 wherein said resilient means is a circular spring which is compressible inwardly by said innermost surface upon movement of said lobe until it engages one of said grooves whereupon it expands therein to retain said lobe in position.

7. The cam according to claim 1 wherein the lobe includes an outwardly projecting center rib and the outer surface of said lobe includes two substantially parallel grooves formed therein, one on each side of said rib, one of which is engageable at any given time by said lobe locking means.

References Cited

UNITED STATES PATENTS

| | | |
|---|---|---|
| 2,045,251 | 6/1936 | Raber. |
| 2,163,864 | 6/1939 | Bissell _____ 74—568 |
| 2,648,237 | 8/1953 | Falconi. |
| 2,728,248 | 12/1955 | De Vlieg. |
| 2,759,371 | 8/1956 | White _____ 74—568 |
| 2,812,671 | 11/1957 | Mottu. |
| 2,996,935 | 8/1961 | Williams. |
| 3,151,500 | 10/1964 | Kurz _____ 74—568 |
| 3,194,086 | 7/1965 | Laschenski _____ 74—568 |
| 3,301,089 | 1/1967 | Wechsler _____ 74—568 |

MILTON KAUFMAN, Primary Examiner

F. D. SHOEMAKER, Assistant Examiner